United States Patent
Onaka et al.

(10) Patent No.: US 12,450,916 B2
(45) Date of Patent: Oct. 21, 2025

(54) INFORMATION PROCESS SYSTEM

(71) Applicant: HONDA MOTOR CO., LTD., Tokyo (JP)

(72) Inventors: Junichiro Onaka, Tokyo (JP); Junya Obara, Tokyo (JP); Yusuke Ishida, Tokyo (JP); Kenta Maruyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 114 days.

(21) Appl. No.: 18/242,042

(22) Filed: Sep. 5, 2023

(65) Prior Publication Data
US 2024/0087334 A1   Mar. 14, 2024

(30) Foreign Application Priority Data
Sep. 12, 2022   (JP) .................. 2022-144266

(51) Int. Cl.
*G06V 20/58* (2022.01)
*G02B 27/01* (2006.01)
(Continued)

(52) U.S. Cl.
CPC ......... *G06V 20/58* (2022.01); *G02B 27/0172* (2013.01); *G06F 3/14* (2013.01); *G06F 3/16* (2013.01); *G06V 20/59* (2022.01)

(58) Field of Classification Search
None
See application file for complete search history.

(56) References Cited

U.S. PATENT DOCUMENTS

2014/0292805 A1   10/2014   Yamada et al.
2015/0042799 A1   2/2015    Zhang et al.
(Continued)

FOREIGN PATENT DOCUMENTS

JP   06-215292   8/1994
JP   11-205782   7/1999
(Continued)

OTHER PUBLICATIONS

Japanese Office Action for Japanese Patent Application No. 2022-144266 mailed May 21, 2024.

*Primary Examiner* — Samira Monshi
(74) *Attorney, Agent, or Firm* — Amin, Turocy & Watson, LLP

(57) ABSTRACT

An information process system includes: a first apparatus that is provided on a movable body on which an occupant boards; and a second apparatus that is used by a user at a place different from the movable body. The first apparatus includes: a first communication device that communicates with a second communication device of the second apparatus; and a camera unit that is capable of capturing an image of the inside and the outside of the movable body. The second apparatus includes: the second communication device that communicates with the first communication device; a display device that displays an image; and a second control device that switches, in response to an operation of the user, between a first mode that causes the display device to display an image which includes a predetermined interior of the movable body and is captured by the camera unit and a second mode that causes the display device to display a replacement image in which a region of the predetermined interior in the image captured by the camera unit is replaced by an image outside the movable body.

15 Claims, 10 Drawing Sheets

(51) Int. Cl.
    *G06F 3/14*     (2006.01)
    *G06F 3/16*     (2006.01)
    *G06V 20/59*     (2022.01)

(56) References Cited

U.S. PATENT DOCUMENTS

| | | | |
|---|---|---|---|
| 2016/0042543 | A1 | 2/2016 | Hashimoto et al. |
| 2019/0286123 | A1* | 9/2019 | Bando .................. G06T 15/205 |
| 2020/0004240 | A1 | 1/2020 | Biehler et al. |
| 2020/0193183 | A1 | 6/2020 | Watanabe et al. |
| 2024/0129621 | A1* | 4/2024 | Yi ....................... G06F 3/04842 |

FOREIGN PATENT DOCUMENTS

| | | |
|---|---|---|
| JP | 2009-038428 | 2/2009 |
| JP | 2014-197818 | 10/2014 |
| JP | 2014-200018 | 10/2014 |
| JP | 2018-207286 | 12/2018 |
| JP | 2020-094958 | 6/2020 |
| JP | 2020-160826 | 10/2020 |
| JP | 2020-529049 | 10/2020 |
| JP | 2022-040819 | 3/2022 |
| JP | 2022-086263 | 6/2022 |

* cited by examiner

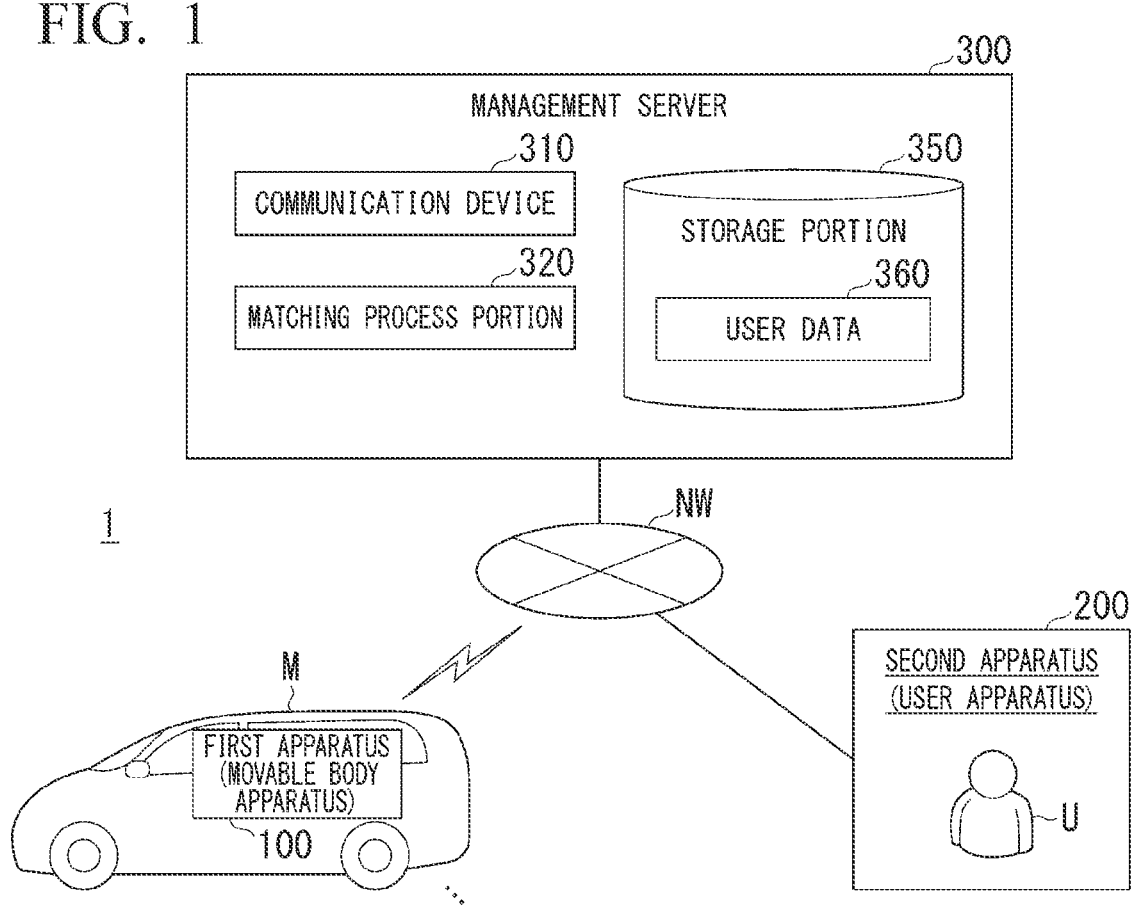

FIG. 6
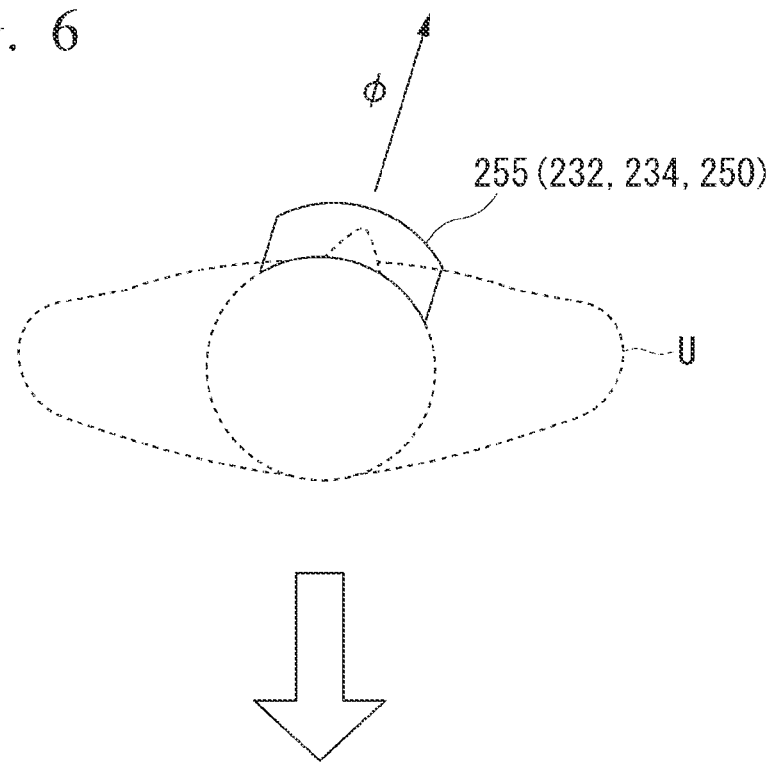
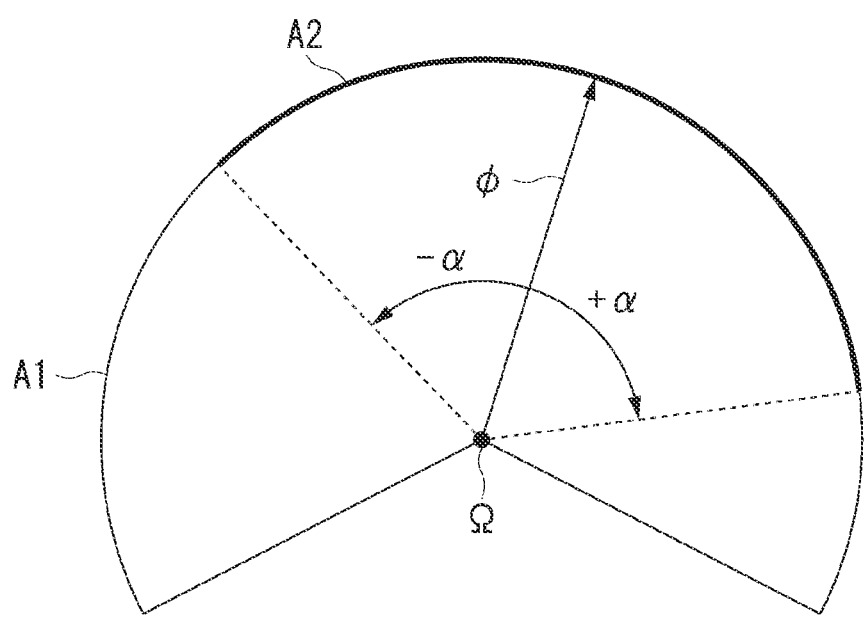

INFORMATION PROCESS SYSTEM

CROSS-REFERENCE TO RELATED APPLICATION

Priority is claimed on Japanese Patent Application No. 2022-144266, filed on Sep. 12, 2022, the contents of which are incorporated herein by reference.

BACKGROUND

Field of the Invention

The present invention relates to an information process system.

Background

In the related art, research has been conducted on performing communications between a device provided on a movable body such as a vehicle and an apparatus used at another place different from the movable body and sharing an image of the scenery outside the vehicle or the like (refer to Japanese Patent Application, First Publication No. 2020-94958).

SUMMARY

In the technique of the related art, there may be cases in which it is difficult for a user present at a place different from the movable body to see the scenery outside the movable body due to the influence of an interior component provided in the movable body.

An object of an aspect of the present invention is to provide an information process system that enables a user present at a place different from a movable body to easily see scenery outside the movable body.

An information process system according to a first aspect of the present invention includes: a first apparatus that is provided on a movable body on which an occupant boards; and a second apparatus that is used by a user at a place different from the movable body, wherein the first apparatus includes: a first communication device that communicates with a second communication device of the second apparatus; and a camera unit that includes at least an inside camera provided on a predetermined seat of the movable body and is capable of capturing an image of the inside and the outside of the movable body, the second apparatus includes: the second communication device that communicates with the first communication device; a display device that displays an image captured by the camera unit; and a second control device that switches, in response to an operation of the user, between a first mode that causes the display device to display an image which includes a predetermined interior of the movable body and is captured by the camera unit and a second mode that causes the display device to display a replacement image in which a region of the predetermined interior in the image captured by the camera unit is replaced by an image outside the movable body captured by the camera unit.

A second aspect is the information process system according to the first aspect described above, wherein the second control device may recommend either the first mode or the second mode based on a travel state of the movable body.

A third aspect is the information process system according to the second aspect described above, wherein the second control device may recommend either the first mode or the second mode based on an image of scenery outside the movable body captured by the camera unit.

A fourth aspect is the information process system according to the second aspect described above, wherein the second control device may recommend either the first mode or the second mode depending on whether or not the movable body is being parked at a garage.

A fifth aspect is the information process system according to the second aspect described above, wherein the second control device may recommend either the first mode or the second mode depending on whether or not another movable body is approaching the movable body.

A sixth aspect is the information process system according to the first aspect described above, wherein the camera unit may further include an outside camera that is provided outside the movable body, and the display device may display, in the second mode, the replacement image in which the region of the predetermined interior in the image captured by the inside camera is replaced by the image outside the movable body captured by the outside camera.

A seventh aspect is the information process system according to the first aspect described above, wherein the first apparatus may further include: a first speaker that outputs a sound which is emitted by the user and is acquired via the first communication device; and a first microphone that collects a sound emitted by the occupant, the second apparatus may further include: a second speaker that outputs a sound which is emitted by the occupant and is acquired via the second communication device; and a second microphone that collects a sound emitted by the user, the first communication device may transmit the sound collected by the first microphone to the second communication device, and the second communication device may transmit the sound collected by the second microphone to the first communication device.

An eighth aspect is the information process system according to the first aspect described above, wherein the second apparatus may further include a detection device for detecting an orientation direction of the user, and the display device may display an image corresponding to the orientation direction when seen from the predetermined seat in the image captured by the camera unit.

A ninth aspect is the information process system according to the eighth aspect described above, wherein the second communication device may transmit information of the orientation direction to the first communication device, the first apparatus may further include a first control device that controls the first communication device so as to selectively transmit, to the second communication device, the image corresponding to the orientation direction which is acquired via the first communication device in the image captured by the camera unit, and the display device of the second apparatus may display the image corresponding to the orientation direction when seen from the predetermined seat which is acquired via the second communication device.

A tenth aspect is the information process system according to the eighth aspect described above, wherein the first communication device may transmit the image captured by the camera unit to the second communication device, and the second control device may cause the display device to selectively display the image corresponding to the orientation direction in the image captured by the camera unit.

An eleventh aspect is the information process system according to the eighth aspect described above, wherein the display device may be a display device of VR (Virtual Reality) goggles, and the detection device may include a physical sensor that is attached to the VR goggles.

A twelfth aspect is the information process system according to the first aspect described above, wherein the movable body may be a vehicle, and the predetermined interior may be a pillar or a roof provided in the vehicle.

A thirteenth aspect is the information process system according to the first aspect described above, wherein the display device may replace a portion that images a predetermined article in a room of the movable body in the image captured by the camera unit with an image drawn according to a computer process and display the image.

According to the first to thirteenth aspects described above, it is possible to enable a user present at a place different from the movable body to easily see scenery outside the movable body.

BRIEF DESCRIPTION OF THE DRAWINGS

FIG. 1 is a view showing a use environment or the like of an information process system and a management server.

FIG. 2 is a view showing an example of the contents of user data.

FIG. 6 is a view describing an image corresponding to an orientation direction.

DESCRIPTION OF EMBODIMENTS

Figure 3:
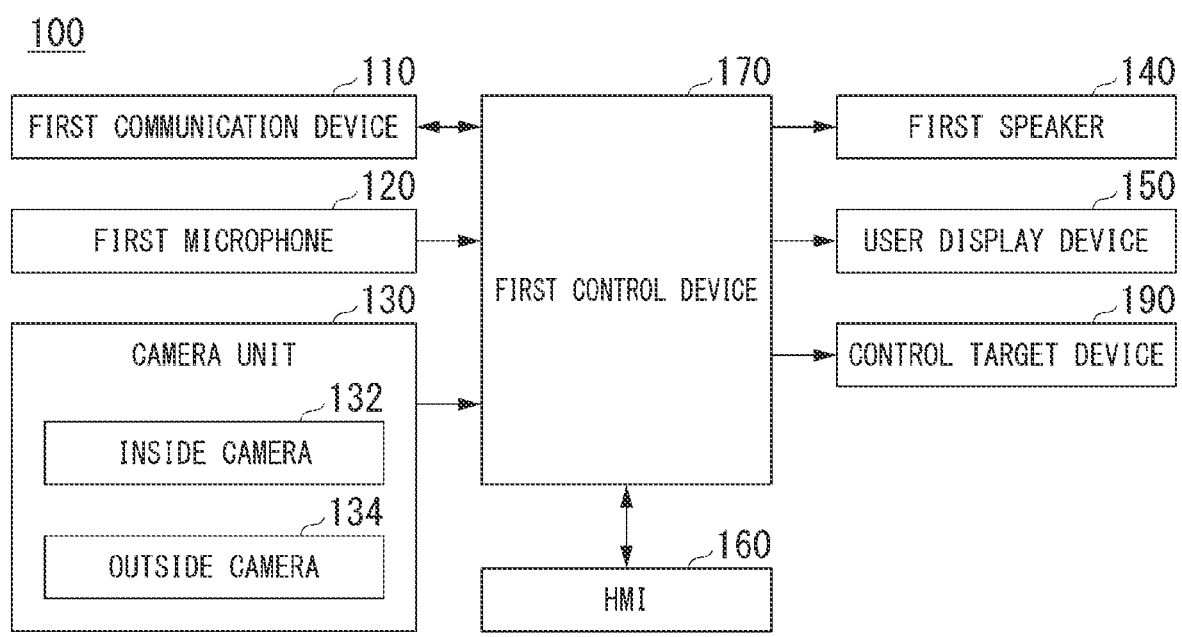
FIG. 3 is a configuration view of a first apparatus.

Hereinafter, an information process system according to embodiments of the present invention will be described with reference to the drawings. The information process system includes: a first apparatus that is provided on a movable body on which an occupant boards; and a second apparatus that is used by a user at a place different from the movable body. The movable body is, for example, a vehicle but may be any movable body on which an occupant is capable of boarding. The occupant is generally a driver of the movable body but may be an occupant other than the driver.

Between the first apparatus and the second apparatus, by a sound that is collected by a microphone being transmitted to the other side and played by a speaker, a state of performing phone communication is achieved, and by part of an image that is captured by a camera unit of the first apparatus being displayed by the second apparatus, an MR (Mixed Reality) is provided to the second apparatus side. The first apparatus and the second apparatus need not be in a one-to-one relationship but may operate as an information process system by matching one of a plurality of first apparatuses with a plurality of second apparatuses in a one-to-many relationship. In the latter case, for example, one occupant can communicate simultaneously or sequentially with a plurality of users.

<Basic Configuration>

FIG. 1 is a view showing a use environment or the like of an information process system 1 and a management server 300. The information process system 1 includes: a first apparatus (a movable body apparatus) 100 provided on a movable body M; and a second apparatus (a user apparatus) 200 used by a user U at a place (not excluding a near place incidentally) different from the movable body M. Each of the first apparatus 100, the second apparatus 200, and the management server 300 communicates with each other via a network NW. The information process system 1 may include or may not include the management server 300.

The management server 300 includes, for example, a communication device 310, a matching process portion 320, and a storage portion 350. User data 360 is stored in the storage portion 350.

The communication device 310 is a communication interface for connecting to the network NW.

Communications between the communication device 310 and the first apparatus 100 and communications between the communication device 310 and the second apparatus 200 are performed, for example, in accordance with the TCP/IP (Transmission Control Protocol/Internet Protocol).

The matching process portion 320 is implemented, for example, by a processor such as a CPU (Central Processing Unit) executing a program (command group) stored in a storage medium. The storage portion 350 is a RAM (Random-Access Memory), a HDD (Hard Disk Drive), a flash memory, or the like.

FIG. 2 is a view showing an example of the contents of the user data 360. The user data 360 includes, for example, an occupant list 360A in which an occupant ID that is identification information of an occupant P, communication identification information (an IP address or the like) of the occupant, and a user ID that is identification information of a user U who is a matching target are associated with one another; and a user list 360B in which a user ID, communication identification information (an IP address or the like) of the user, and an occupant P who is a matching target are associated with one another. The user data 360 is not limited to the form shown in FIG. 2 and may be generated in any form including this information.

When the communication device 310 receives a matching request from the user U via the second apparatus 200 or from the occupant P via the first apparatus 100, the matching process portion 320 performs matching of a matching user U and an occupant P with reference to the user data 360, transmits the communication identification information of the first apparatus 100 of the occupant P to the second apparatus 200 of the matched user U using the communication device 310, and transmits the communication identification information of the second apparatus 200 of the user U to the first apparatus 100 of the matched occupant P using the communication device 310. Between the first apparatus 100 and the second apparatus 200 that receive this information, communications having a higher real time property are performed, for example, in accordance with the UDP (User Datagram Protocol).

FIG. 3 is a configuration view of the first apparatus 100. The first apparatus 100 includes, for example, a first communication device 110, a first microphone 120, a camera unit 130, a first speaker 140, a user display device 150, a HMI (Human Machine Interface) 160, and a first control device 170. The first control device 170 is connected to a control target device 190 provided on the movable body M.

The first communication device 110 is a communication interface for communicating via the network NW with each of the communication device 310 of the management server 300 and the second communication device 210 of the second apparatus 200.

The first microphone 120 collects at least a sound emitted by the occupant P. The first microphone 120 may be a microphone that is provided in a room of the movable body M and has a sensitivity capable of also collecting a sound outside the movable body M, or may include a microphone that is provided in the room of the movable body M and a microphone that is provided outside the movable body M. The sound collected by the first microphone 120 is transmitted to the second communication device 210 by the first communication device 110, for example, via the first control device 170.

The camera unit 130 includes at least an inside camera 132 and may include an outside camera 134. The first speaker 140 outputs the sound emitted by the user U that is acquired via the first communication device 110. Details of the arrangement or the like of the camera unit 130 and the first speaker 140 will be described later with reference to FIG. 4.

The user display device 150 virtually displays the user U as if the user U were present in the room of the movable body M. For example, the user display device 150 causes a hologram to appear or displays the user U at a portion that corresponds to a mirror or a window of the movable body M.

The HMI 160 is a touch panel, a sound response device (agent device), or the like. The HMI 160 receives various commands of the occupant P with respect to the first apparatus 100.

The first control device 170 includes, for example, a processor such as a CPU and a storage medium connected to the processor and storing a program (command group) and controls each portion of the first apparatus 100 by the processor executing the command group.

The control target device 190 may be, for example, a navigation device, a drive support device, or the like that is provided on the movable body M.

Figure 4:
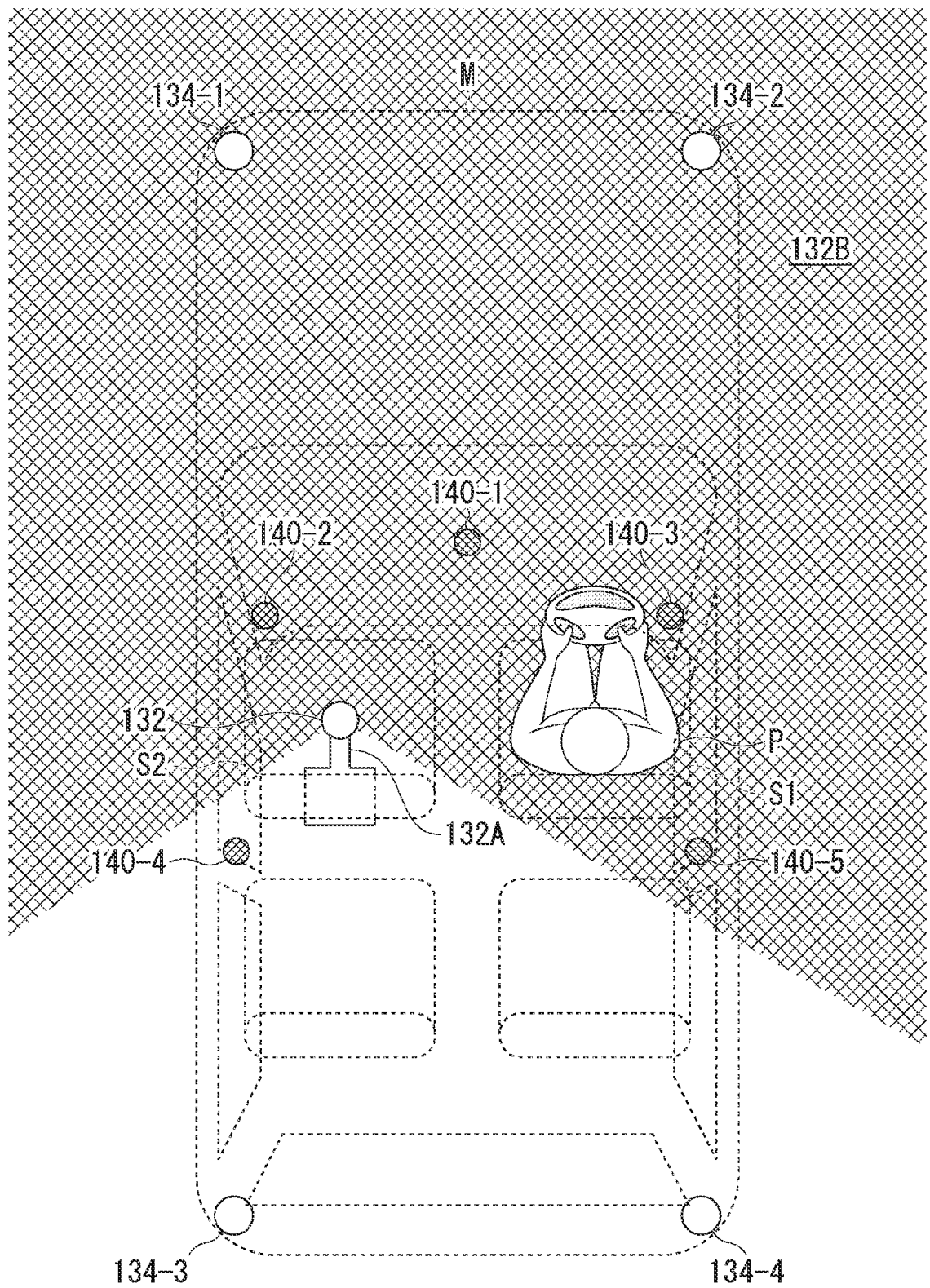
FIG. 4 is a view showing an arrangement example of a portion of the first apparatus in a movable body.

FIG. 4 is a view showing an arrangement example of a portion of the first apparatus 100 in the movable body M. The inside camera 132 is attached, for example, to a neck pillow of a passenger seat S2 (an example of a "predetermined seat") via an attachment 132A and is provided at a position slightly away from a backrest of the passenger seat S2 to a travel direction side of the movable body M. The inside camera 132 has a wide angle lens and is capable of capturing an image of a range represented by a hatched region 132B in the drawing. The inside camera 132 is capable of capturing an image of not only the room inside of the movable body M but also the outside of the room through the window. In the following description, the passenger seat S2 is the predetermined seat, but the predetermined seat may be another seat such as a rear seat.

The outside camera 134 includes, for example, a plurality of child outside cameras 134-1 to 134-4. By synthesizing images captured by the plurality of child outside cameras 134-1 to 134-4, an image such as a panoramic image in which the outside of the movable body M is imaged can be obtained. In place of (or in addition to) these, the outside camera 134 may include a wide angle camera provided on the roof of the movable body M.

A camera capable of imaging the rear of the passenger seat S2 may be added as the inside camera 132, and a movable body image described later may be generated as a 360-degree panoramic image by combining the images captured by one or more inside cameras 132 by the first control device 170, or may be generated as a 360-degree panoramic image by appropriately combining the image captured by the inside camera 132 and the image captured by the outside camera 134.

The first speaker 140 outputs the sound of the user U acquired via the first communication device 110. The first speaker 140 includes, for example, a plurality of first child speakers 140-1 to 140-5. For example, the first child speaker 140-1 is arranged on a middle portion of an instrument panel, the first child speaker 140-2 is arranged on a left end portion of the instrument panel, the first speaker 140-3 is arranged on a right end portion of the instrument panel, the first speaker 140-4 is arranged on a lower portion of a left door, and the first child speaker 140-5 is arranged on a lower portion of a right door. When the first control device 170 causes the first speaker 140 to output the sound of the user U, for example, by outputting sounds of a similar volume from the first child speaker 140-2 and the first child speaker 140-4 and turning off the rest of first child speakers, the first control device 170 performs sound localization such that the occupant P seated in a driver seat S1 hears the sound from the passenger seat S2. Further, the method of sound localization is not limited to the adjustment of the volume and may also be performed by shifting the phases of sounds output by the first child speakers. For example, when the sound localization is performed such that one hears a sound from the left side, a timing when a sound is output from the first left child speaker may be slightly earlier than a timing when the same sound is output from the first right child speaker.

Further, when the first control device 170 causes the first speaker 140 to output the sound of the user U, the first control device 170 may perform the sound localization such that the occupant P hears the sound from a position of a height corresponding to the height of the head of the user U on the passenger seat S2 and may cause the first speaker 140 to output the sound emitted by the user U. In this case, the first speaker 140 is required to have a plurality of first child speakers 140-$k$ (k is a plurality of natural numbers) having a different height.

Figure 5:
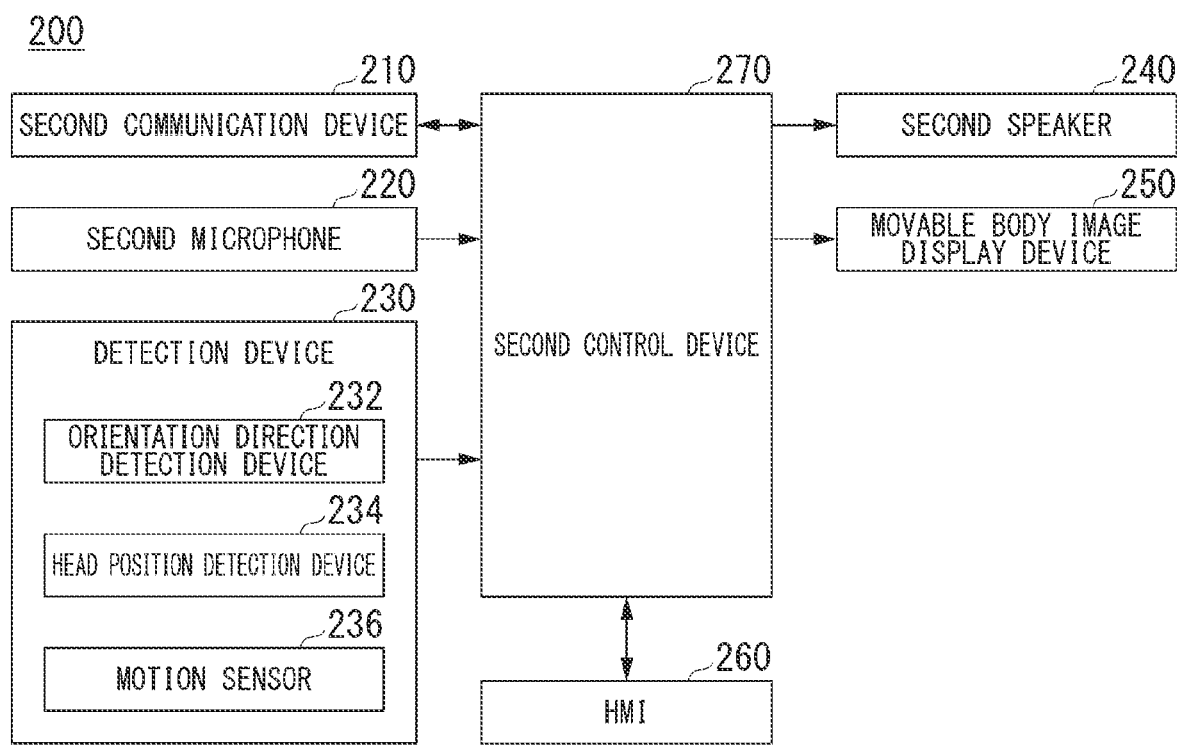
FIG. 5 is a configuration view of a second apparatus.

FIG. 5 is a configuration view of the second apparatus 200. The second apparatus 200 includes, for example, a second communication device 210, a second microphone 220, a detection device 230, a second speaker 240, a movable body image display device 250, an HMI 260, and a second control device 270. The detection device 230 includes, for example, an orientation direction detection device 232, a head position detection device 234, and a motion sensor 236.

The second communication device 210 is a communication interface for communicating via the network NW with each of the communication device 310 of the management server 300 and the first communication device 110 of the first apparatus 100.

The second microphone 220 collects a sound emitted by the user U. The sound collected by the second microphone 220 is transmitted to the first communication device 110 by the second communication device 210, for example, via the second control device 270.

The orientation direction detection device 232 is a device for detecting an orientation direction. The orientation direction is a direction of the face of the user U, a direction of the visual line, or a direction based on both of the directions of the face and the visual line. Alternatively, the orientation direction may be a direction indicated by the movement of the arm or the finger such as a motion of tilting a terminal device used by the user U or an operation of swiping a screen. Hereinafter, the orientation direction may be an angle within the horizontal plane, that is, an angle that does not have a component in an upward-downward direction, but the orientation direction may be an angle that also includes the component in the upward-downward direction. The orientation direction detection device 232 may include a physical sensor (for example, an acceleration sensor, a gyro sensor, or the like) attached to VR (Virtual Reality) goggles described later, or may be an infrared sensor that detects a plurality of positions of the head portion of the user U or a camera that images the head portion of the user U. In any case, the second control device 270 calculates an orientation direction on the basis of information input from the orientation direction detection device 232. In this regard, since various techniques are known, detailed descriptions are omitted.

The head position detection device 234 is a device for detecting a position (height) of the head portion of the user U. For example, one or more infrared sensors or optical sensors provided around a chair on which the user U is seated are used as the head position detection device 234. In this case, the second control device 270 detects the position of the head portion of the user U on the basis of the presence or absence of a detection signal by the one or more infrared sensors or optical sensors. Further, the head position detection device 234 may be an acceleration sensor attached to the VR goggles. In this case, the second control device 270 detects the position of the head portion of the user U by integrating values obtained by subtracting the gravitational acceleration from the output of the acceleration sensor. Information of the position of the head portion acquired in this way is provided to the second control device 270 as height information.

The position of the head portion of the user may be acquired based on an operation of the user U to the HMI 260. For example, the user U may enter the body height numerically into the HMI 260 or may enter the body height using a dial switch included in the HMI 260. In these cases, the position of the head portion, that is, the height information is calculated from the body height. Alternatively, the user U may enter a discrete value such as a physical size: large/medium/small in place of a continuous value into the HMI 260. In this case, the height information is acquired based on the information indicating the physical size. Alternatively, the height of the head portion of the user may not be acquired, and the height of the head portion of the user U may be simply acquired based on the physical size of a general adult (which may depend on the gender).

The motion sensor 236 is a device for recognizing a gesture operation performed by the user U. For example, a camera that captures an image of the upper body of the user U is used as the motion sensor 236. In this case, the second control device 270 extracts a characteristic point (a fingertip, a wrist, an elbow, or the like) of the body of the user U from the image captured by the camera and recognizes the gesture operation of the user U on the basis of the motion of the characteristic point.

The second speaker 240 outputs a sound that is emitted by the occupant P and is acquired via the second communication device 210. The second speaker 240 has, for example, a function of changing the direction from which the sound is heard. The second control device 270 causes the second speaker to output the sound such that the user U hears the sound from a position of the occupant P seen from the passenger seat S2. The second speaker 240 may include a plurality of second child speakers 240-*n* (n is a plurality of natural numbers), and the second control device 270 may perform the sound localization by adjusting the volumes of the child second speakers 240-*n* or may perform the sound localization using the function of headphones when the VR goggles include headphones.

The movable body image display device 250 displays an image that corresponds to an orientation direction seen from the passenger seat in an image (which may be an image obtained by performing the combination process described above, hereinafter referred to as a movable body image) captured by the camera unit 130. FIG. 6 is a view describing an image corresponding to an orientation direction. In the example of this drawing, VR goggles 255 include the orientation direction detection device 232, a physical sensor as the head position detection device 234, and the movable body image display device 250. The second control device 270 detects, as an orientation direction p, a direction which the VR goggles 255 face using a direction calibrated in advance as a reference direction. With respect to such a function, since various methods are already known, detailed descriptions are omitted.

The movable body image display device 250 displays an image A2 having an angular range of ±α centered on the orientation direction φ in the movable body image A1 (which has an angle of about 240 degrees in the drawing, but an angle of view may be extended by the combination process described above) toward the user U.

The HMI 260 is a touch panel, a sound response device (agent device), a switch described above, or the like. The HMI 260 receives various commands of the user U with respect to the second apparatus 200.

The second control device 270 includes, for example, a processor such as, for example, a CPU and a storage medium connected to the processor and storing a program (command group) and controls each portion of the second apparatus 200 by the processor executing the command group.

<Function Configuration>

Hereinafter, function configurations of the first control device 170 and the second control device 270 are described.

First Example

Figure 7:
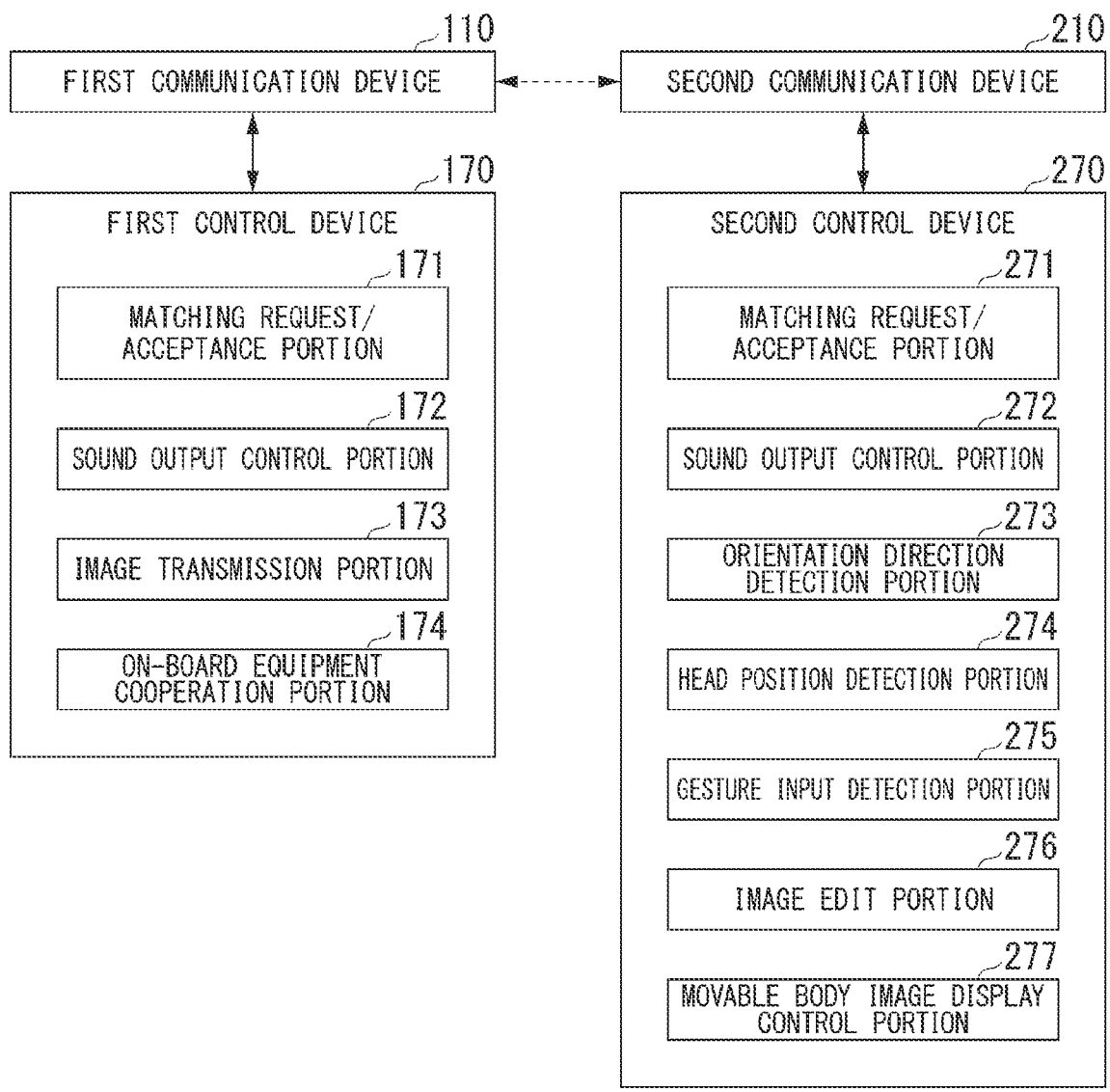
FIG. 7 is a view showing a first example of a function configuration of a first control device and a second control device.

FIG. 7 is a view showing a first example of a function configuration of the first control device 170 and the second control device 270. In the first example, the first control device 170 includes a matching request/acceptance portion 171, a sound output control portion 172, an image transmission portion 173, and an on-board equipment cooperation portion 174. The second control device 270 includes a matching request/acceptance portion 271, a sound output control portion 272, an orientation direction detection portion 273, a head position detection portion 274, a gesture input detection portion 275, an image edit portion 276, and a movable body image display control portion 277. These function portions are implemented, for example, by a processor such as a CPU executing a program (command group). Some or all of these components may be implemented by hardware (a circuit portion including circuitry) such as a LSI (Large-Scale Integration), an ASIC (Application-Specific Integrated Circuit), a FPGA (Field-Programmable Gate Array), and a GPU (Graphics-Processing Unit) or may be implemented by cooperation of software and hardware.

The matching request/acceptance portion 171 receives an input of a matching request from the occupant P using the HMI 160 and transmits the matching request to the management server 300, or receives an input of acceptance for the matching request received from the management server 300 using the HMI 160 and transmits the acceptance to the management server 300. The matching request/acceptance portion 171 controls the first communication device 110 such that the second apparatus 200 of the user U with which the matching is established is a communication partner.

The sound output control portion 172 controls the first speaker 140 as described above.

The image transmission portion 173 transmits the movable body image A1 to the second apparatus 200 using the first communication device 110.

The on-board equipment cooperation portion 174 controls the control target device 190 on the basis of a command signal input from the second apparatus 200.

The matching request/acceptance portion 271 receives an input of a matching request from the user U using the HMI 260 and transmits the matching request to the management server 300, or receives an input of acceptance for the matching request received from the management server 300 using the HMI 260 and transmits the acceptance to the management server 300. The matching request/acceptance portion 271 controls the second communication device 210 such that the first apparatus 100 of the occupant P with which the matching is established is a communication partner.

The sound output control portion 272 controls the second speaker 240 as described above.

The orientation direction detection portion 273 detects the orientation direction φ on the basis of the output of the orientation direction detection device 232. The head position detection portion 274 detects a head position of the user U on the basis of the output of the head position detection device 234. The head position may be represented as a three-dimensional coordinate, or the height of the head portion may be simply detected as the head position. The gesture input detection portion 275 detects a gesture input of the user U on the basis of the output of the motion sensor 236.

The image edit portion 276 performs a process of cutting out the image A2 corresponding to the orientation direction φ when seen from the passenger seat from the movable body image A1 (FIG. 6). The movable body image display control portion 277 causes the movable body image display device 250 to display the image A2 cut out by the image edit portion 276. At this time, the image edit portion 276 may cause the movable body image display device 250 to display an image corresponding to an orientation direction φ when seen at a height indicated by the height information of the head portion of the user U.

Second Example

Figure 8:
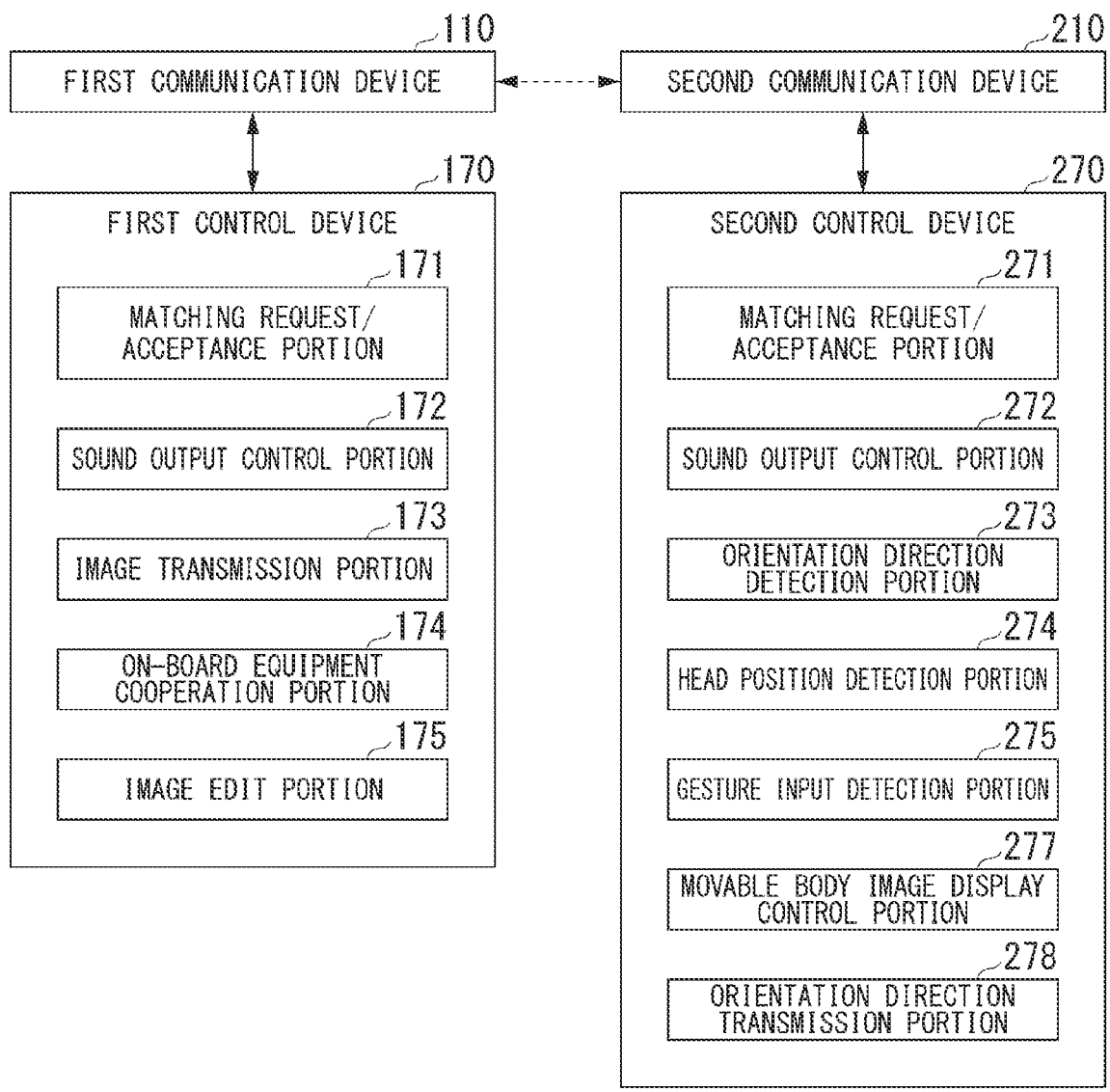
FIG. 8 is a view showing a second example of a function configuration of the first control device and the second control device.

FIG. 8 is a view showing a second example of a function configuration of the first control device 170 and the second control device 270. Compared to the first example of FIG. 7, differences are that the first control device 170 includes an image edit portion 175, and the second control device 270 does not include the image edit portion 276 but includes an orientation direction transmission portion 278. Since other components have basically the same functions as those of the first example, repeated descriptions are omitted.

The orientation direction transmission portion 278 transmits an orientation direction φ detected by the orientation direction detection portion 273 to the first apparatus 100 using the second communication device 210.

The image edit portion 175 performs a process of cutting out an image A2 corresponding to an orientation direction φ (which is transmitted from the second apparatus 200) when seen from the passenger seat from the movable body image A1 (FIG. 6). At this time, the image edit portion 175 may acquire the height information of the head portion of the user U from the second apparatus 200 and perform a process of cutting out an image A2 corresponding to an orientation direction φ when seen at a height indicated by the height information.

The image transmission portion 173 in the second example transmits the image A2 cut out by the image edit portion 175 to the second apparatus 200 using the first communication device 110. Then, the movable body image display control portion 277 causes the movable body image display device 250 to display the image A2 transmitted from the first apparatus 100.

<Normal Mode>

Figure 9:
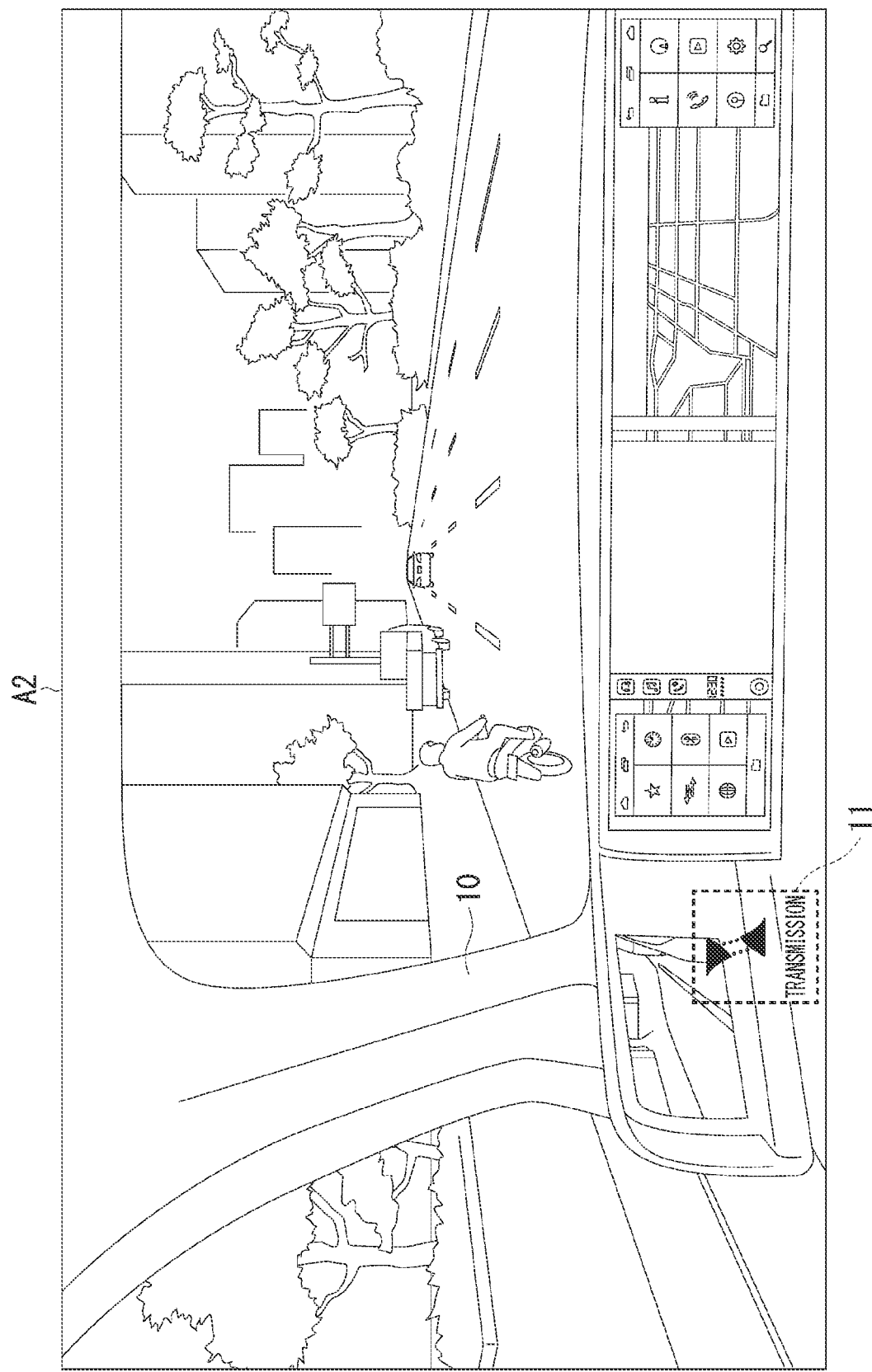
FIG. 9 is a view showing an example of an image in a normal mode.

FIG. 9 is a view showing an example of an image A2 in a normal mode. The normal mode (first mode) is a mode in which an image A2 that includes a predetermined interior of the movable body M and is captured by the camera unit 130 is displayed. The image A2 is displayed on the movable body image display device 250. As described above, the image A2 is an image that is cut out from the movable body image A1 and is an image corresponding to the orientation direction φ when seen from the passenger seat.

In the example shown in FIG. 9, the image A2 includes an image of a pillar 10 as a predetermined interior provided on the movable body M. The pillar 10 is an interior that has a column shape and connects a roof and a body of the movable body M together. Here, a front pillar provided at a forward position of the movable body M is described as an example of the pillar 10; however, the pillar 10 may be a rear pillar provided at a rearward position of the movable body M.

As shown in FIG. 9, since the scenery outside the movable body M is blocked by the pillar 10, it is difficult for the user U to see the scenery outside the movable body M. Accordingly, in the present embodiment, the user U can select a transmission mode in which the interior of the movable body M such as the pillar 10 is made transparent and the scenery outside the movable body M can be seen.

Specifically, the user U can switch the mode from the normal mode to the transmission mode by selecting a transmission mode icon 11 included in the image A2. For example, the gesture input detection portion 275 of the second control device 270 may detect that the user U performs a gesture of selecting the transmission mode icon 11 with the user's finger on the basis of the output of the motion sensor 236. The second control device 270 may switch the mode from the normal mode to the transmission mode when the gesture input detection portion 275 detects that the transmission mode icon 11 is selected.

<Transmission Mode>

Figure 10:
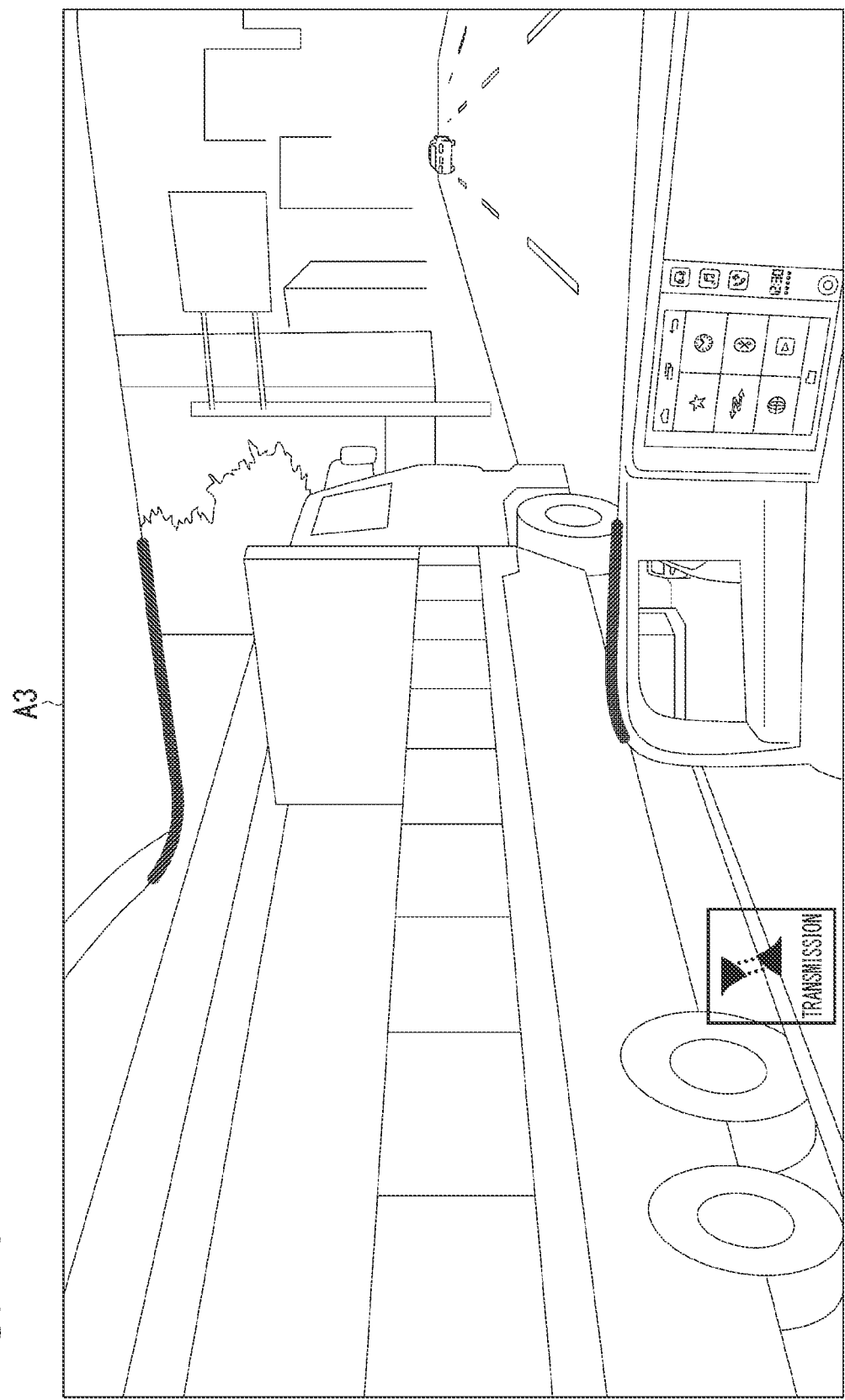
FIG. 10 is a view showing an example of a replacement image in a transmission mode.

FIG. 10 is a view showing an example of a replacement image A3 in the transmission mode. The transmission mode (second mode) is a mode that displays a replacement image A3 in which a region of the predetermined interior (for example, the pillar 10) in the image A2 captured by the camera unit 130 is replaced by an image outside the movable body captured by the camera unit 130. The replacement image A3 is displayed on the movable body image display device 250.

As shown in FIG. 10, by replacing the region of the pillar 10 by the image outside the movable body M captured by the camera unit 130, the user U can easily see scenery outside the movable body M. The image outside the movable body M may be an image captured by the outside camera 134. In this case, the movable body image display device 250 may display, in the transmission mode, the replacement image A3 in which the region of the pillar 10 in the image A2 captured by the inside camera 132 is replaced by the image outside the movable body M captured by the outside camera 134.

For example, in the case of the first example described above, the replacement image A3 is generated by the image edit portion 276.

Specifically, the image transmission portion 173 of the first control device 170 transmits the movable body image A1 and the image outside the movable body M to the second apparatus 200 using the first communication device 110. The image edit portion 276 of the second control device 270 performs a process of cutting out the image A2 corresponding to an orientation direction φ when seen from the passenger seat from the movable body image A1 and generates the replacement image A3 in which the region of the pillar 10 in the image A2 is replaced by the image outside the movable body M.

On the other hand, in the case of the second example described above, the replacement image A3 is generated by the image edit portion 175. Specifically, the image edit portion 175 of the first control device 170 performs a process of cutting out an image A2 corresponding to an orientation direction φ (which is transmitted from the second apparatus 200) when seen from the passenger seat from the movable body image A1 and generates the replacement image A3 in which a region of the pillar 10 in the image A2 is replaced by an image outside the movable body M. The image transmission portion 173 transmits the replacement image A3 generated by the image edit portion 175 to the second apparatus 200 using the first communication device 110.

The predetermined interior of the movable body M is the pillar 10 provided in the vehicle; however, the embodiment is not limited to thereto. For example, the predetermined interior of the movable body M may be a roof. In this case, the movable body image display device 250 may display, in the transmission mode, a replacement image A3 in which a region of the roof in the image A2 captured by the inside camera 132 is replaced by an image outside the movable body M captured by the outside camera 134 provided on the roof. Thereby, it is possible to enable the user U to further easily see scenery outside the movable body M.

Further, when the image outside the movable body M in the region of the pillar 10 can be captured using only the inside camera 132, the outside camera 134 may not be used. For example, the first control device 170 may store images A2 continuously captured by the inside camera 132 in a storage device and generate an image outside the movable body M in the region of the pillar 10 using the stored past images A2. In this case, the movable body image display device 250 may display, in the transmission mode, a replacement image A3 in which a region of the pillar 10 in the image A2 captured by the inside camera 132 is replaced by an image outside the movable body M generated by the first control device 170.

Further, when the user U moves the position of the head to let the user's head out from the window of the movable body M, the second control device 270 may cause the movable body image display device 250 to display the image outside the movable body M captured by the camera unit 130. Further, when the user U stands up and thereby moves the user's head above the roof, the image outside the movable body M captured by the camera unit 130 may be displayed on the movable body image display device 250. Thereby, it is possible to allow the user U to further easily see scenery outside the movable body M.

<Recommendation Process of Mode>

Next, a recommendation process of the mode is described. The second control device 270 may recommend either the normal mode (first mode) or the transmission mode (second mode) on the basis of a travel state of the movable body M. For example, the second control device 270 may cause the movable body image display device 250 to display a message that recommends any one of the normal mode and the transmission mode or may cause the second speaker 240 to output the message. Alternatively, the transmission mode may be recommended by highlighting the transmission mode icon 11.

For example, the second control device 270 may recommend either the normal mode or the transmission mode on the basis of an image of scenery outside the movable body M captured by the camera unit 130. Specifically, the second control device 270 may recommend the transmission mode when the user U can see scenery with a good view such as when the movable body M is traveling along the coast. In this case, the second control device 270 may determine whether or not the user U can see scenery with a good view using a learned model in which the image of the scenery outside the movable body M is an input and a value indicating whether or not the scenery is scenery with a good view is an output. The learned model may be generated, for example, using a function by AI such as mechanical learning (neural network) using teacher (correct) data or deep learning. Thereby, it is possible to enable the user U to easily see scenery with a good view.

Further, for example, the second control device 270 may recommend either the normal mode or the transmission mode depending on whether the movable body M is being parked at a garage. Specifically, the second control device 270 may recommend the transmission mode when the movable body M is being parked at a garage. For example, the second control device 270 may determine whether or not the movable body M is being parked at a garage in response to a command from the occupant P via the HMI 160 or may determine whether or not the movable body M is being parked at a garage on the basis of an image outside the movable body M captured by the camera unit 130. Thereby, the user U can easily grasp the situation of the movable body M parking at the garage.

Further, for example, the second control device 270 may recommend either the normal mode or the transmission mode depending on whether or not another movable body is approaching the movable body M. Specifically, the second control device 270 may recommend the transmission mode when another movable body such as an emergency vehicle (such as an ambulance) or a bicycle is approaching the movable body M. For example, the second control device 270 may determine whether or not another movable body is approaching the movable body M on the basis of the image outside the movable body M captured by the camera unit 130. Thereby, the user U can easily grasp a position relationship between the movable body M and the other movable body.

Other Embodiments

The embodiment is described using an example in which, in the information process system 1, the user U can view any direction when seen from the passenger seat S2; however, the direction which can be viewed by the user U may be restricted, for example, by an agreement at the time of matching. For example, there may be a request on the occupant P side in which scenery in the travel direction of the movable body M or scenery on the opposite side of the driver seat S1 may be provided, but the occupant does not want to display his/her own image. This is assumed for a case in which the occupant P and the user U are not in a relationship such as a family or a friend and which responds to the needs that one would like to confirm driving feelings of the movable body M or one would like to view the scenery of a desired city. In this case, when the matching process portion 320 of the management server 300 performs the matching process, such a restriction is set, and the first control device 170 or the second control device 270 masks an angle range not to be viewed or performs correction such that the orientation direction φ is not directed in a restricted direction in accordance with the setting. Further, information regarding such a restriction relates to the privacy of the occupant P and therefore may be set on the first apparatus 100 side.

Figure 11:
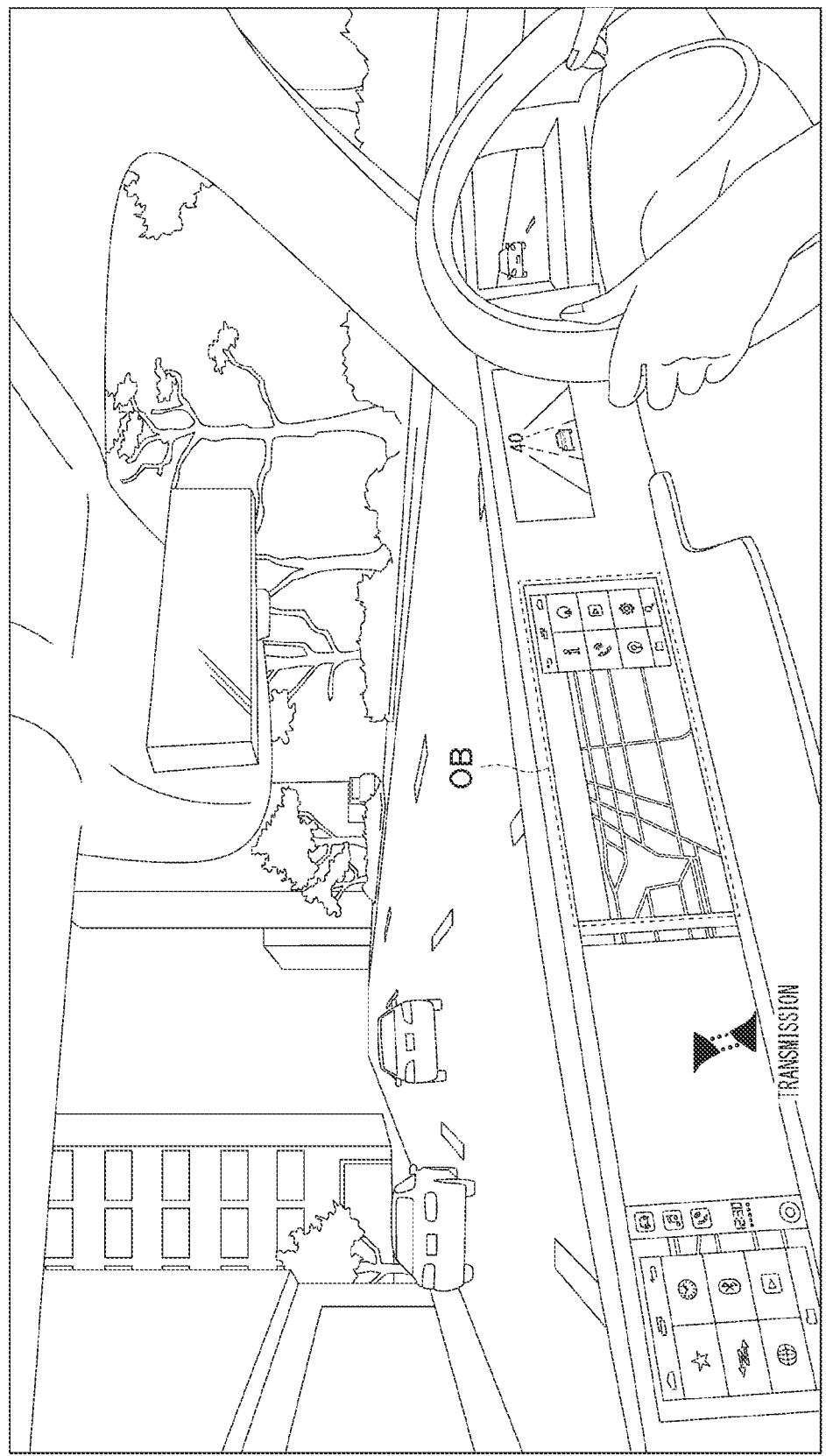
FIG. 11 is a view showing an example of displaying the replacement image.

Further, the movable body image display device 250 may replace a portion that images a predetermined article in a room of the movable body M in the image captured by the camera unit 130 with an image (CG image) drawn according to a computer process and display the image. FIG. 11 is a view showing an example of displaying a replacement image. In the drawing, reference numeral OB represents a display device that performs navigation display or the like and is an example of a "predetermined article". When an image in which the display screen of the display device is imaged is displayed as is, the image may become blurred, or the visibility may be degraded due to the reflection of light. Therefore, the movable body image display device 250 may acquire the data for constituting the display screen of the display device or image data drawn according to the computer process in the movable body M from the first apparatus, embed an image redrawn according to a computer process from the data or the acquired image data into an (edited) image captured by the camera unit 130, and display the image. In this case, the position of the article in the room of the movable body M which is a predetermined article is shared in advance by the first apparatus 100 and the second apparatus, and the movable body image display control portion 277 determines whether or not the predetermined article is included in the image displayed on the movable body image display device 250, for example, on the basis of the orientation direction φ and performs the replacement of the image as described above when it is determined that the predetermined article is included in the image. The "predetermined article" may be the head portion or the face of the occupant P. In that case, the CG image such as an avatar may be changed depending on the display of the occupant P.

SUMMARY

The information process system 1 having a configuration as described above includes: the first apparatus 100 that is provided on the movable body M on which the occupant P boards; and the second apparatus 200 that is used by the user U at a place different from the movable body M. The first apparatus 100 includes: the first communication device 110 that communicates with the second communication device 210 of the second apparatus 200; and the camera unit 130 that includes at least the inside camera 132 provided on the predetermined seat of the movable body M and is capable of capturing an image of the inside and the outside of the movable body M. The second apparatus 200 includes: the second communication device 210 that communicates with the first communication device 110; the movable body image display device 250 that displays the image captured by the camera unit 130; and the second control device 270 that switches, in response to the operation of the user, between the normal mode (first mode) that causes the movable body image display device 250 to display the image A2 that includes the predetermined interior (the pillar 10 or the like) of the movable body M and is captured by the camera unit 130 and the transmission mode (second mode) that causes the movable body image display device 250 to display the replacement image A3 in which the region of the predetermined interior in the image A2 captured by the camera unit 130 is replaced by the image outside the movable body M captured by the camera unit 130. Thereby, it is possible to enable the user U present at a place different from the movable body M to easily see scenery outside the movable body M.

Use Example

The information process system 1 can be used in the following forms.

(A) A form in which the occupant P and the user U are in a relationship such as a family or a friend, and a virtual drive is provided to the user U. The user U can talk with the occupant P about the scenery around the movable body M or the like while seeing the image.

(B) A form in which the occupant P is a public user, and the user U is a provider of a road guidance service, a driving instruction service, or the like. The user U can perform road guidance at a place that is not easily known using a navigation device or is not shown on a map while seeing the scenery around the movable body M or perform instructions of drive operation.

(C) A form in which the occupant P is a famous person, the user U is a public user, and a virtual drive on a commercial basis is provided to the user U. In this case, a plurality of users U may be simultaneously associated with one occupant P, and, for example, the transfer of sound from the user U side may be set to be OFF.

Although embodiments of the present invention have been described with reference to the drawings, the present invention is not limited to such embodiments, and various modifications and substitutions can be made without departing from the scope of the present invention.

What is claimed is:

1. An information process system comprising:
   a first apparatus that is provided on a movable body on which an occupant boards; and
   a second apparatus that is used by a user at a place different from the movable body,
   wherein the first apparatus includes:
      a first communication device that communicates with a second communication device of the second apparatus; and
      a camera unit that includes at least an inside camera provided on a predetermined seat of the movable body and is capable of capturing an image of an inside and an outside of the movable body,
   the second apparatus includes:
      the second communication device that communicates with the first communication device;
      a display device that displays an image captured by the camera unit; and
      a second control device that switches, in response to an operation of the user, between a first mode that causes the display device to display an image which includes a predetermined interior of the movable body and is captured by the camera unit and a second mode that causes the display device to display a replacement image in which a region of the predetermined interior in the image captured by the camera unit is replaced by an image outside the movable body captured by the camera unit,
wherein the second control device recommends either the first mode or the second mode based on a travel state of the movable body.

2. The information process system according to claim 1, wherein the second control device recommends either the first mode or the second mode based on an image of scenery outside the movable body captured by the camera unit.

3. The information process system according to claim 1, wherein the second control device recommends either the first mode or the second mode depending on whether or not the movable body is being parked at a garage.

4. The information process system according to claim 1, wherein the second control device recommends either the first mode or the second mode depending on whether or not another movable body is approaching the movable body.

5. The information process system according to claim 1, wherein the camera unit further includes an outside camera that is provided outside the movable body, and
the display device displays, in the second mode, the replacement image in which the region of the predetermined interior in the image captured by the inside camera is replaced by the image outside the movable body captured by the outside camera.

6. The information process system according to claim 1, wherein the movable body is a vehicle, and
the predetermined interior is a pillar or a roof provided in the vehicle.

7. The information process system according to claim 1, wherein the display device replaces a portion that images a predetermined article in a room of the movable body in the image captured by the camera unit with an image drawn according to a computer process and displays the image.

8. The information process system according to claim 2, wherein the second control device recommends either the first mode or the second mode based on a position of a head of the user.

9. The information process system according to claim 1, wherein the second control device determines whether or not the user is capable of seeing scenery with a good view based on an image of scenery outside the movable body captured by the camera unit, and
the second control device recommends the second mode when the second control device determines that the user is capable of seeing scenery with a good view.

10. The information process system according to claim 9, wherein the second control device determines whether or not the user is capable of seeing scenery with a good view based on the image of the scenery outside the movable body captured by the camera unit using a learned model in which the image of the scenery outside the movable body is an input and a value indicating whether or not the scenery is scenery with a good view is an output.

11. An information process system, comprising:
a first apparatus that is provided on a movable body on which an occupant boards; and
a second apparatus that is used by a user at a place different from the movable body,
wherein the first apparatus includes:
a first communication device that communicates with a second communication device of the second apparatus; and
a camera unit that includes at least an inside camera provided on a predetermined seat of the movable body and is capable of capturing an image of an inside and an outside of the movable body,
the second apparatus includes:
the second communication device that communicates with the first communication device;
a display device that displays an image captured by the camera unit; and
a second control device that switches, in response to an operation of the user, between a first mode that causes the display device to display an image which includes a predetermined interior of the movable body and is captured by the camera unit and a second mode that causes the display device to display a replacement image in which a region of the predetermined interior in the image captured by the camera unit is replaced by an image outside the movable body captured by the camera unit,
wherein the first apparatus further includes:
a first speaker that outputs a sound which is emitted by the user and is acquired via the first communication device; and
a first microphone that collects a sound emitted by the occupant,
the second apparatus further includes:
a second speaker that outputs a sound which is emitted by the occupant and is acquired via the second communication device; and
a second microphone that collects a sound emitted by the user,
the first communication device transmits the sound collected by the first microphone to the second communication device, and
the second communication device transmits the sound collected by the second microphone to the first communication device.

12. An information process system, comprising:
a first apparatus that is provided on a movable body on which an occupant boards; and
a second apparatus that is used by a user at a place different from the movable body,
wherein the first apparatus includes:
a first communication device that communicates with a second communication device of the second apparatus; and
a camera unit that includes at least an inside camera provided on a predetermined seat of the movable body and is capable of capturing an image of an inside and an outside of the movable body,
the second apparatus includes:
the second communication device that communicates with the first communication device;
a display device that displays an image captured by the camera unit; and
a second control device that switches, in response to an operation of the user, between a first mode that causes the display device to display an image which includes a predetermined interior of the movable body and is captured by the camera unit and a second mode that causes the display device to display a replacement image in which a region of the predetermined interior in the image captured by the camera unit is replaced by an image outside the movable body captured by the camera unit, wherein the second apparatus further includes a detection device for detecting an orientation direction of the user, and the display device displays an image corresponding to the orientation direction when seen from the predetermined seat in the image captured by the camera unit.

13. The information process system according to claim 12, wherein the second communication device transmits information of the orientation direction to the first communication device, the first apparatus further includes a first control device that controls the first communication device so as to selectively transmit, to the second communication device, the image corresponding to the orientation direction which is acquired via the first communication device in the image captured by the camera unit, and the display device of the second apparatus displays the image corresponding to the orientation direction when seen from the predetermined seat which is acquired via the second communication device.

14. The information process system according to claim 12, wherein the first communication device transmits the image captured by the camera unit to the second communication device, and the second control device causes the display device to selectively display the image corresponding to the orientation direction in the image captured by the camera unit.

15. The information process system according to claim 12, wherein the display device is a display device of VR (Virtual Reality) goggles, and the detection device includes a physical sensor that is attached to the VR goggles.

* * * * *